United States Patent [19]

Lewis, Jr. et al.

[11] Patent Number: 4,544,945
[45] Date of Patent: Oct. 1, 1985

[54] LOGARITHMIC COLOR MATRIX FOR A DIGITAL TELEVISION RECEIVER

[75] Inventors: Henry G. Lewis, Jr., Hamilton Square; Thomas M. Stiller, Ewing Township, Mercer County, both of N.J.

[73] Assignee: RCA Corporation, Princeton, N.J.

[21] Appl. No.: 501,895

[22] Filed: Jun. 7, 1983

[51] Int. Cl.[4] .......................... H04N 9/52; H04N 9/32
[52] U.S. Cl. .......................................... 358/30; 358/13
[58] Field of Search ....................... 358/30, 13, 23, 27, 358/24

[56]      References Cited
       U.S. PATENT DOCUMENTS

| 4,270,139 | 5/1981 | Flamm et al. | 358/23 |
| 4,303,912 | 12/1981 | Stafford et al. | 358/13 X |
| 4,352,123 | 9/1982 | Flamm | 358/23 |
| 4,398,209 | 8/1983 | Robitzsch | 358/27 |
| 4,470,069 | 9/1984 | Lewis, Jr. et al. | 358/31 |
| 4,503,454 | 3/1985 | Lewis, Jr. | 358/13 |

FOREIGN PATENT DOCUMENTS 1319686 6/1973 United Kingdom ................ 358/305

OTHER PUBLICATIONS

"The Marconi B3410 Line-array Telecine", by R. Matchell, *Communications & Broadcasting*, Feb. 1982, vol. 7, No. 2, pp. 33–38.
"The Marconi B3410 Line Array Telecine", by R. Matchell, SMPTE Journal, Nov. 1982, pp. 1066–1070.
"Digital Video Processing for Telecine", by A de M. Fremont, *Communications & Broadcasting*, Feb. 1983, vol. 8, No. 2, pp. 35–40.
"Digital Signal Processing for the Marconi Line Array Telecine", by R. Matchell, *Marconi Communication Systems*, Montreaux Record, 1983.

Primary Examiner—John C. Martin
Assistant Examiner—Michael P. Dunnam
Attorney, Agent, or Firm—Eugene M. Whitacre; Paul J. Rasmussen; Joseph J. Laks

[57]   ABSTRACT

In a digital television receiver, a signal processing stage generates color mixture digital signals representing color picture information as components in a first color mixture coordinate system such as the I-Q system. The I and Q digital signals are applied to a read only memory look-up table in which memory locations are stored the logarithmic values of the signals in order to convert the signals into digital words represented in logarithmic form. A microprocessor or other digital circuit generates or retrieves digital coefficients in logarithmic form that enable the I and Q digital signals to be transformed into second color mixture digital signals representing the color picture information as components in a second color mixture coordinate system such as the R-Y, B-Y, color difference coordinate system. The I and Q digital signals in logarithmic form are applied to a first input of an adder. A digital store stores the coefficients, and a multiplexer coupled to the digital store supplies to a second input of the adder a sequence of coefficients in the same order corresponding to the sequence of I and Q digital signals being applied to the first input of the adder. At the output of the adder there is developed a plurality of products in logarithmic form that correspond to the values of the I and Q constituents of the R-Y, B-Y digital signals. The plurality of products are applied to an antilog read only memory look-up table in which memory locations are stored the inverse logarithmic values of the I and Q constituents. A second adder receives the output of the antilog ROM, now in straight arithmetic form, to obtain the R-Y, B-Y or G-Y color difference signals.

14 Claims, 5 Drawing Figures

LOGARITHMIC COLOR MATRIX FOR A DIGITAL TELEVISION RECEIVER

This invention relates to a digital color matrix for a digital television receiver.

In a digital television receiver, an analog baseband video signal is sampled and the samples converted to representative digital samples by an analog-to-digital converter. The digital samples are processed in a digital comb filter to produce digital signals representing separated luminance and chrominance information. The digital luminance and chrominance information containing signals are then processed in respective channels of a digital signal processor to produce digital color mixture signals such as the I and Q signals and digital luminance or Y signals.

A digital matrix may be used to combine the I, Q and Y signals to produce R, G and B primary color digital samples. The digital samples are then applied to a digital-to-analog converter arrangement to develop respective R, G and B drive voltages for driving the cathodes of a color picture tube. To develop the R, G and B digital samples in a digital matrix, the R-Y, G-Y and B-Y color difference signals are generated from the I and Q color mixture signals. The Y luminance signal is then added to each of the three color difference signals to develop the three primary color samples. The three color difference signals are related to the two color mixture signals by a set of coefficients $a_i$, $b_i$, $i=r,g,b$ in accordance with the following equations:

$$R-Y = a_r I + b_r Q$$

$$G-Y = a_g I + b_g Q$$

$$B-Y = a_b I + b_b Q$$

Where $a_i$, $b_i$ have well known, established values.

In the U.S. patent application of H. G. Lewis, Jr., Ser. No. 444,521 (now Pat. No. 4,503,454), filed Nov. 26, 1982, entitled COLOR TELEVISION RECEIVER WITH A DIGITAL PROCESSING SYSTEM THAT DEVELOPS DIGITAL DRIVER SIGNALS FOR A PICTURE TUBE, the products of the I and Q samples multiplied by the appropriate coefficients $a_i$, $b_i$ are obtained by using a read-only memory, ROM, constructed as a look-up table multiplier. The I and Q digital samples address locations within the ROM, in which locations are stored the product information.

If the values of the coefficients $a_i$, $b_i$ are not fixed but may dynamically vary, then the memory capacity requirements of a ROM may be unduly large. A random access memory, RAM, may be used in such a situation. Use of these devices, however, represents a relatively expensive solution to enable the I and Q samples to be multiplied by variably valued coefficients.

Incorporating a ROM in a look-up table configuration has the advantageous feature of providing a fast access capability to the information contained therein. Such fast access capability may be desirable when the I and Q samples that are to be multiplied by their respective coefficients are developed at a relatively rapid rate, such as at a $4f_{sc}$ rate, where $f_{sc}$ is the 3.58 megahertz color subcarrier frequency.

A feature of the invention is a digital color matrix that is capable of producing color mixture signals such as R-Y, B-Y color difference signals from its constituents such as from the original I and Q digital samples. Another feature of the invention is the use of a ROM in a digital matrix to produce the matrix transformation without the ROM being used per se as a look-up table multiplier. Still another feature is the use of a ROM in a digital matrix when variable coefficients are involved in the matrixing. Yet still another feature of the invention is a digital matrix that is capable of processing digital color mixture samples that are supplied to it at a relatively high data rate while using memories of relatively small sizes.

A digital signal processor generates first color mixture digital signals representing color picture information as components in a first color mixture coordinate system. These digital signals are then converted into logarithmic form by means of, for example, a logarithmic ROM look-up table. A computer or other digital circuit generates digital coefficients in logarithmic form that enable the first color mixture digital signals to be transformed into second color mixture digital signals representing color picture information as components in a second color mixture coordinate system. An adder sums the first color mixture digital signals in logarithmic form with the digital coefficients in logarithmic form to obtain digital signals in logarithmic form that represent a plurality of products corresponding to the first color mixture constituents of the second color mixture digital signals. By means of inverse logarithmic operation, the plurality of products are converted into the first color mixture constituents, which are then combined to obtain the second color mixture digital signals.

The first color mixture digital signals may be generated as a sequence of components related in phase to first and second color axes of the first color mixture coordinate system. These components have associated therewith differently valued digital coefficients. To provide a sequence of coefficients to the adder in the proper order corresponding to the sequence of components, the coefficients are first stored in a digital store. A multiplexer coupled to the digital store and to the adder then supplies the coefficients in the proper sequence.

Figure 1:
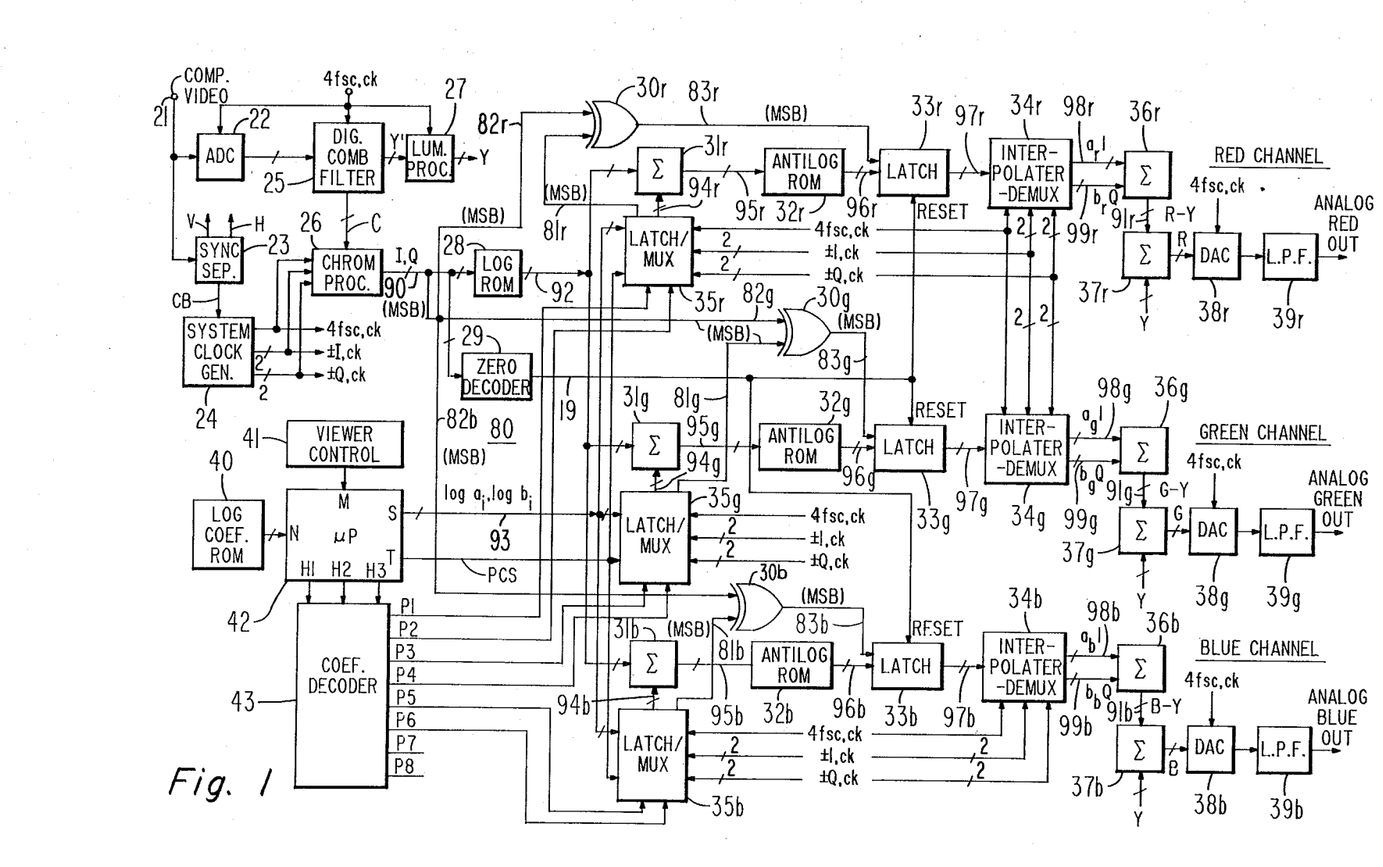
FIG. 1 illustrates a digital signal processing system for a digital television receiver including a multiplexed, logarithmic digital matrix, embodying the invention.

In the digital signal processing system for a digital television receiver, illustrated in FIG. 1, an analog composite video signal is developed at a terminal 21 by preceding conventional analog circuitry, not illustrated. An analog-to-digital converter, ADC 22 samples the composite video signal to produce binary coded digital samples. A digital comb filter 25 processes the digital composite video samples to develop a binary coded digital luminance signal Y' and a binary coded digital chrominance signal C. A digital luminance processor 27 takes the luminance samples Y' and processes it to provide such features as vertical detail restoration in the output digital luminance signal Y.

The analog composite video signal at terminal 21 is also applied to an analog sync separator 23 for developing horizontal and vertical sync pulses along signal lines H and V for horizontal and vertical deflection circuits, not illustrated in FIG. 1. Sync separator 23 also supplies along a signal line CB a color burst reference signal of frequency $f_{sc}$, the color subcarrier frequency. This signal is supplied to a system clock generator 24 of the digital signal processing system.

System clock generator 24 develops I-clock and Q-clock signals of frequency $f_{sc}$, illustrated in FIGS. 4b and 4c. These clock signals are synchronized, respectively, with the I-axis and Q-axis phase points of the color burst reference signal. In addition, system clock generator 24 develops -I-clock and -Q-clock signals of frequency $f_{sc}$, illustrated in FIGS. 4d and 4e, that are synchronized with the -I-axis and -Q-axis phase points of the color burst reference signal. System clock generator 24 also generates a $4f_{sc}$ system clock, illustrated in FIG. 4a, of frequency four times the color subcarrier frequency and in-phase with the ±I and ±Q clocks.

The ±I and ±Q clocks, as well as the $4f_{sc}$ system clock, are supplied to a chrominance processor 26. Chrominance processor 26 receives the digital chrominance signal C and demodulates it on the ±I and ±Q axes of the color burst reference signal to produce a sequence of binary coded, digital color mixture ±I and ±Q samples, appearing on a data bus 90. The I and Q digital samples generated by chrominance processor 26 comprise first color mixture digital signals representing color picture information as in-phase related, I components and quadrature-phase related, Q components in a I-Q color mixture coordinate system.

The I and Q digital samples developed along data bus 90 are supplied to a digital matrix 80, embodying the invention, for developing, in a manner hereafter to be described, binary coded, digital, color difference samples, the R-Y, G-Y and B-Y samples, along respective data buses 91r, 91g and 91b. The R-Y, G-Y and B-Y digital samples are applied as respective inputs to adders 37r, 37g and 37b. The digital luminance samples Y are applied as another input to the adders. Red, green and blue digital samples are therefore developed at the outputs of adders 37r, 37g and 37b. These samples are applied respectively to digital-to-analog converters 38r, 38g and 38b for conversion into the analog domain. After filtering by lowpass filters 39r, 39g and 39b, analog red, green and blue signal voltages are produced for use by the picture tube driver circuits of the television receiver, not illustrated in FIG. 1.

Digital color matrix 80 comprises a red channel processor comprising elements 30r–36r, a green channel processor comprising elements 30g–36g, a blue channel processor comprising elements 30b–36b, and elements 28 and 29 that are common to all three channel processors.

In operation of digital matrix 80, the I and Q digital samples developed along data bus 90, are applied to a read only memory look-up table LOGROM 28. The values of the I and Q digital samples may be represented as binary coded digital words in offset two's complement notation, for example. LOGROM 28 converts these digital words into corresponding digital words that represent the values of the I and Q digital samples in logarithmic form. The output of LOGROM 28 along data bus 92 is a sequence of I and Q digital samples in logarithmic form corresponding to the input sequence of samples that were in straight arithmetic form. FIG. 4f illustrates the timing relationship of the sequence of samples $I_1$, $Q_1$, $I'_1$, $Q'_1$, $I_2$, $Q_2$, etc. along data busses 90 and 92, with respect to the ±I and ±Q clocks of FIGS. 4b–4e.

The coefficients used by logarithmic digital matrix 80 may be developed by a microprocessor 42. Microprocessor 42 receives at an input port N, fixed or constant values, in logarithmic form, of the coefficients log $a_i$ and log $b_i$. The logarithmic coefficients received by microprocessor 42 are retrieved from a read only memory ROM 40. Stored in ROM 40 are the standard NTSC values of the coefficients that provide the transformation from the I-Q coordinate system to the R-Y, B-Y coordinate system. These coefficients may be suitably modified to take into account different phosphor efficiencies.

In addition, microprocessor 42 may receive information from various viewer controls generally designated in FIG. 1 as a viewer control block 41. The information from the viewer controls such as contrast and brightness level settings and other controls that affect color picture information such as color saturation, are processed by microprocessor 42 to suitably modify the values of the coefficients log $a_i$ and log $b_i$ to provide the correct color picture information.

At an output port S of microprocessor 42, are developed, in serial fashion, the six variably valued digital logarithmic coefficients log $a_i$, log $b_i$, i=r,g,b. Output port S is coupled by way of data bus 93 to digital stores in each of the latch/multiplexer stages 35r, 35g, and 35b of the red, green and blue channel processors, respectively.

To enable a digital store within a given channel processor to receive the correct coefficient when it is developed along data bus 93, microprocessor 42 develops at output pins H1–H3 a 3-bit binary word that is applied to a conventional one-of-eight decoder 43. Decoder 43 has eight output pins P1–P8, with the last two pins remaining unconnected. When a new value of a given coefficient, such as the green channel I coefficient, log $a_g$, is developed at output port S, the 3-bit binary word indicative of this situation that is developed at pins H0–H2 is then decoded by decoder 43 to produce a high output, for example, on pin P3. Pin P3 is connected to the green channel latch/multiplexer 35g. When that pin goes high, a digital store in stage 35g is enabled and receives the new value of the coefficient log $a_g$. Similarly when a new value of any one of the other five coefficients is developed at output port S, the corresponding one of the other pins of port P goes high to enable a digital store within the appropriate channel processor to accept and store the new value of the coefficient.

It may be desirable for coefficient ROM 40 to store the arithmetic or inverse logarithmic values of the coefficients $a_i$, $b_i$ so as to enable microprocessor 42 to perform simpler calculations when processing the coefficient data. The output of microprocessor 42 at port S in such case is the values of the coefficients $a_i$, $b_i$ in arithmetic form. These coefficients then address another logarithmic read only memory look-up table, not illustrated in FIG. 1, whose output is the coefficients log $a_i$, log $b_i$ developed along data bus 93.

Further description of the operation of digital matrix 80 will now be made with reference to operation of the green channel processor only. Similar operation holds true for the red and blue channel processors.

The sequence of I and Q samples in logarithmic form developed along output data bus 92 is applied to a first input of adder 31g. FIG. 4f illustrates the sequence of I and Q logarithmic samples applied to adder 31g and indicates the duration within which a particular sample is valid. Thus, the sample $I_1$ is valid during the +I clock interval between times $T_1-T_2$, the +$Q_1$ sample is valid during the +Q clock interval between times $T_2-T_3$, the $I'_1$ sample is valid during the −I clock interval between times $T_3-T_4$, and the $Q'_1$ sample is valid during the −Q clock interval between times $T_4-T_5$.

The coefficients $a_g$ and $b_g$ which are needed to form the I and Q constituents, $a_gI$ and $b_gQ$, of the G-Y digital signal are stored in latch/multiplexer 35g. A feature of the invention is the multiplexing out of these coefficients to adder 31g in the proper sequence to enable the adder to generate at its output both the I and the Q constituents of the G-Y color difference signals. To accomplish this result, ±I clock signals, ±Q clock signals and $4f_{sc}$ clock signals are supplied to the multiplexing portion of stage 35g. As illustrated in FIG. 4g, the clock signals just previously mentioned enable stage 35g to supply to adder 31g, at a second adder input, a sequence of coefficients in logarithmic form that alternate between log $a_g$ and log $b_g$, with log $a_g$ being valid at the input to the adder during the +I and −I clock intervals and log $b_g$ being valid at the input to the adder during the +Q and −Q clock intervals.

With the sequence of coefficients being supplied to the second input of adder 31g in the same order as the sequence of I and Q samples being supplied to the first input, a sequence of products in logarithmic form is generated at the output of the adder. This sequence of products is illustrated in FIG. 4h and corresponds to alternating I and Q constituents of the G-Y color difference signal.

The product data developed along data bus 95g, representing the I and Q constituents of the G-Y data, is converted from logarithmic form back to arithmetic form to enable these constituents to be arithmetically added to produce the G-Y digital samples along data bus 91g. To perform the inverse logarithmic operation, the log product data along data bus 95g is supplied to a read only memory, antilog ROM 32g. Stored in the memory locations of ROM 32g are the digital binary coded words representing the values in arithmetic form corresponding to the values of the products being sequentially supplied along data bus 95g. Thus, at the output of antilog ROM 32g there is developed a sequence of digital words in arithmetic form representing the I and Q constituents of the G-Y digital samples. The states of the output data bus 96g of antilog ROM 32g is illustrated by the same FIG. 4h that illustrates the output data bus 95g of adder 31g. When illustrating the output of adder 31g, the data of FIG. 4h is in logarithmic notation, whereas when illustrating the output data of antilog ROM 32g, the data is in straight arithmetic notation.

The digital words from antilog ROM 32g, serially produced along data bus 96g, are stored in a latch 33g. Latch 33g is designed to pass through the information to its output, along data bus 97g.

The data processed through adder 31g and antilog ROM 32g are the lesser significant bits of the I and Q data, the coefficient data and the product data. The most significant bit of the I or Q data represents the sign bit when using offset twos complement notation. Similarly, the most significant bit of the log coefficient $a_g$ or $b_g$ is carried along as a sign bit indicating that the arithmetic value of the coefficient is negative or that an arithmetic subtraction is to be performed after the product associated with that coefficient has been formed.

Because arithmetic multiplication, when performed in logarithmic form as an addition of two digital words, is an unsigned operation, the most significant bit, the sign bit of the log coefficient data developed at the output of stage 35g along a data line 81g, is not coupled to adder 31g but is instead coupled to an input of an exclusive-or stage XOR 30g. The most significant bit or sign bit of the I or Q data developed along data line 82g is applied to another input of XOR stage 30g. By means of the exclusive-or operation of XOR stage 30g, the output of XOR stage 30g along data line 83g, comprises the most significant bit of the product data $a_gI$ or $b_gQ$. The lesser significant bits of the product data that is supplied to latch 33g are obtained from antilog ROM 32g.

Because multiplication of two operands by logarithms is undefined when one of the operands assumes a zero value, log matrix 80 includes a zero decoder stage 29 to take into account multiplication by zero. The I and Q digital samples developed along data bus 90 are applied to zero decoder 29. Decoder 29, which may simply comprise a plural input NOR gate, assesses the values of the I and Q samples. When a zero value condition is detected by decoder 29, an output data line 19 goes high, resetting the output bits of latch 33g to states, such as all "0", that correspond to the zero value of the product data associated with the zero value for the I or Q sample.

Figure 4:
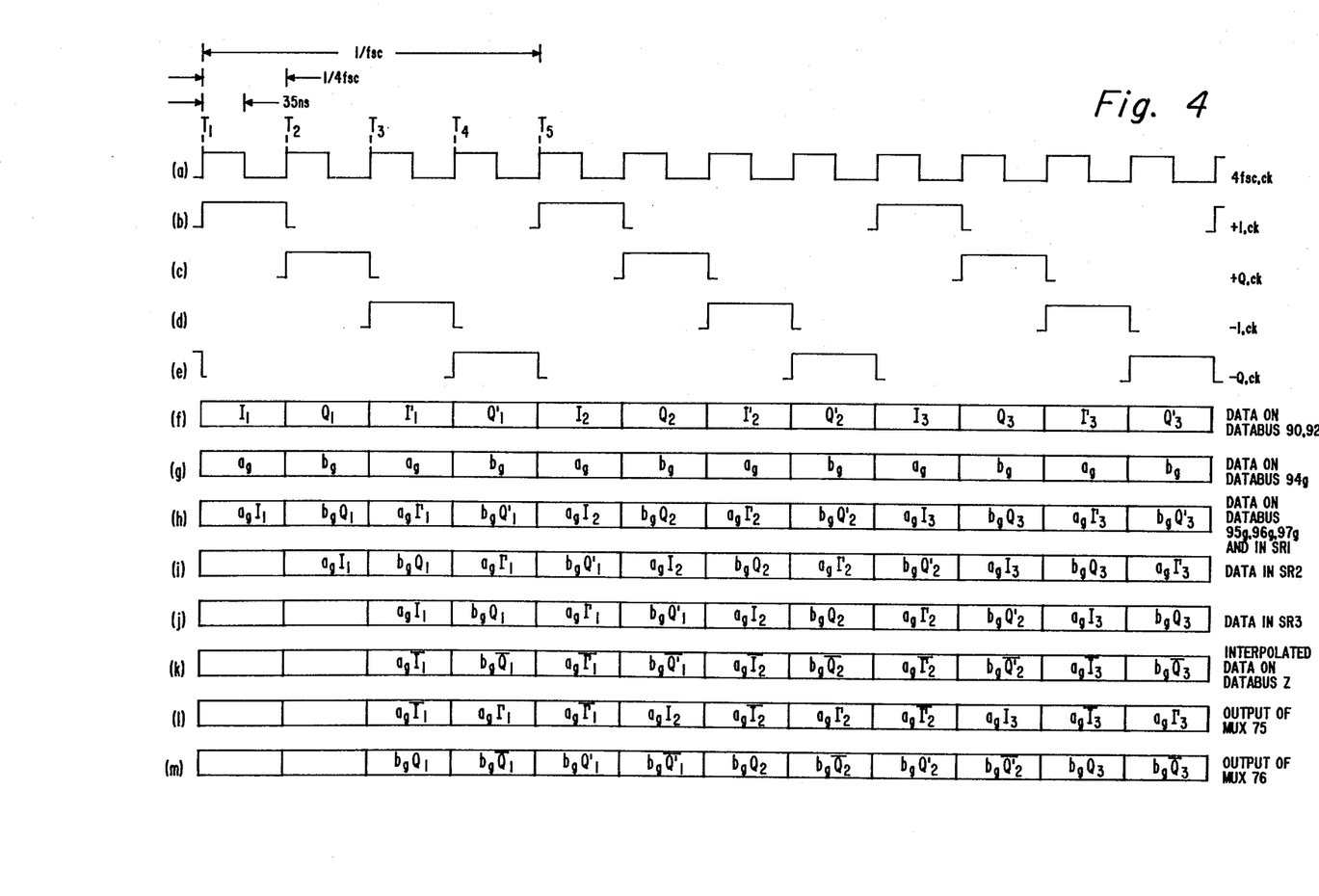
FIG. 4 illustrates a timing and state diagram associated with the operation of the system of FIG. 1.

It should be noted that signal delays through the various stages of digital matrix 80 have not been taken into account in the discussion and in the illustrations of the timing diagram of FIG. 4. In practice, suitable delays, not shown in FIG. 1, are inserted in parallel processing paths prior to their joining at a given stage so as to equalize any unequal proceccessing delays that are encountered during signal propogation.

Figure 2:
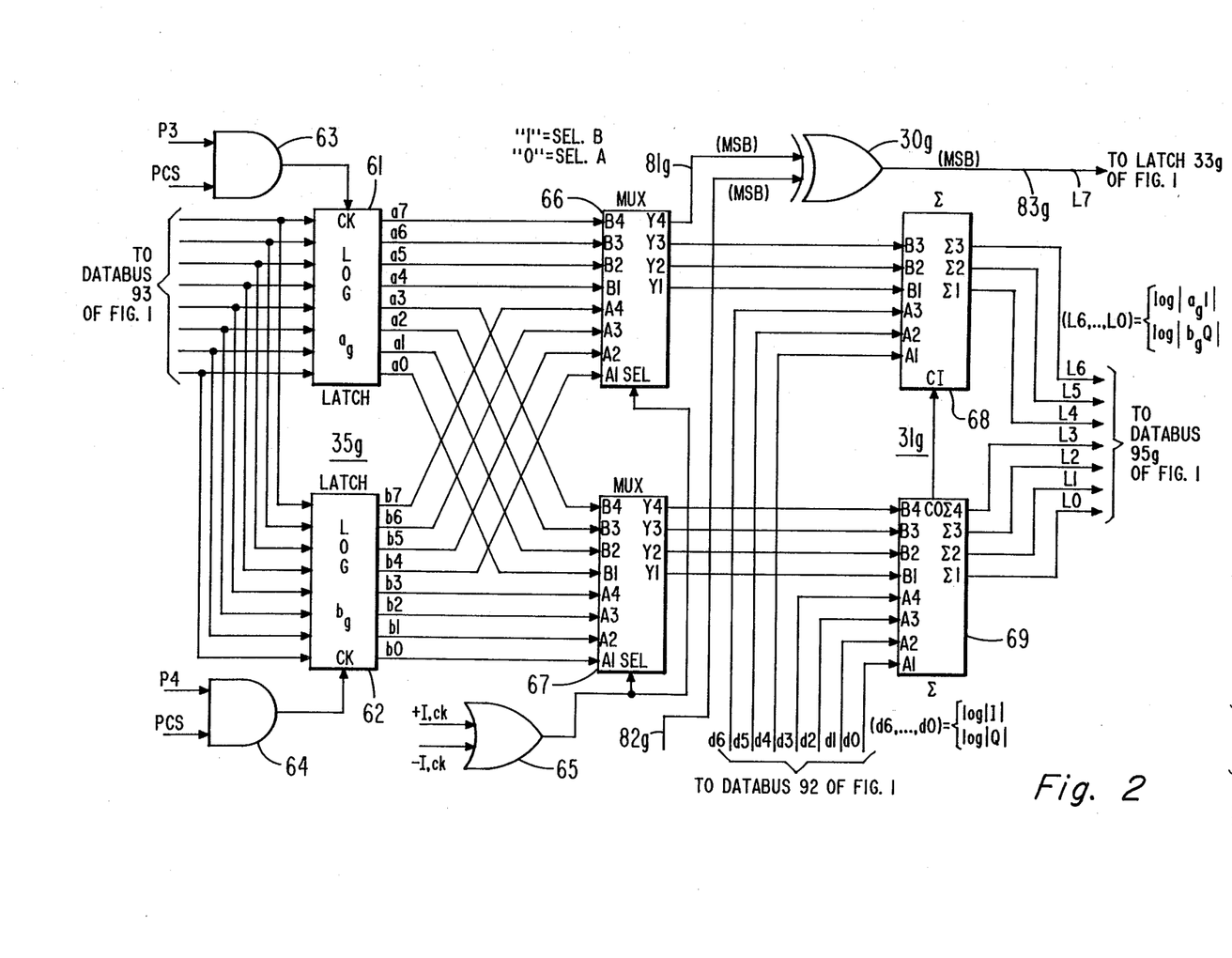
FIG. 2 illustrates a specific embodiment of a portion of the green channel processor within the digital matrix of FIG. 1.

FIG. 2 illustrates a portion of the system of FIG. 1, including specific embodiments of latch/multiplexer 35g and adder 31g. Elements and quantities identified the same in FIGS. 1 and 2, function in a similar manner or represent similar quantities. Microprocessor 42 of FIG. 1 enters new values of the coefficients log $a_g$, log $b_g$ on data bus 93 as they are generated in response to changing television receiver operation. The new value of a particular coefficient that appears on data bus 93 is routed into the appropriate one of two latches 61 and 62 of FIG. 2. The routing of the log $a_g$ coefficient into latch 61 is accomplished when decoder pin P3 goes high. The routing of the coefficient log $b_g$ into latch 62 is accomplished when decoder pin P4 goes high. The new coefficient data is entered into the registers associated with latches 61 and 62 when the signals on pins P3 and P4 are passed through AND gates 63 and 64 to the clock inputs of the latches. AND gates 63 and 64 are enabled when new data is being generated. The gates are enabled by means of a timing pulse developed by microprocessor 42 along timing line PCS.

The coefficient log $a_g$ being supplied to latch 61 may comprise an 8-bit digital word, with the seven lesser bits a0–a6 comprising a binary coded word in logarithmic form indicative of the magnitude of the coefficient, and with the most significant bit, bit a7, comprising the sign bit. Similarly, the log $b_g$ data word being supplied to latch 62 may comprise an 8-bit word, with the seven lesser bits, b0–b6 being a binary coded word in logarithmic form indicative of the magnitude of the coefficient, and with the most significant bit, bit b7, comprising the sign bit.

The higher order bits a4–a7 of the log $a_g$ coefficient stored in latch 61 are supplied respectively to the pins B1–B4 of the B input port of a multiplexer 66. The lower order bits a0–a3 are supplied respectively to the pins B1–B4 of the B input port of a second multiplexer, multiplexer 67. The higher order bits b4–b7 of the log $b_g$ coefficient stored in latch 62 are supplied respectively to the pins A1–A4 of the A input port of multiplexer 66. The lower order bits b0–b3 are supplied respectively to pins A1–A4 of the A input port of multiplexer 67.

Pins Y1–Y4 of the Y output ports of multiplexers 66 and 67 reproduce the states of the pins B1–B4 respectively of the B input ports when the states of the select terminals SEL are high or in the logical "1" states, and reproduce the states of pins A1–A4 respectively of the A input ports when the select terminals are low or in the logical "0" states. The ±I clocks are passed through an OR gate 65 to the select terminals of multiplexers 66 and 67.

During the ±I clocks, the four higher order bits of the log $a_g$ coefficient are developed at the Y output port of multiplexer 66 and the four lower order bits of that coefficient are developed at the Y output port of multiplexer 67. During the ±Q clocks, when the select terminals are in the low state, the four higher order bits of the coefficient log $b_g$ are developed at the Y output port of multiplexer 66 and the four lower order bits of that coefficient are developed at the Y output port of multiplexer 67. During the ±I clocks, the state of pin Y4 of multiplexer 66 represents the state of the most significant bit, the sign bit, a7, of the coefficient log $a_g$. During the ±Q clocks the state of pin Y4 of multiplexer 66 represents the state of the most significant bit, the sign bit, b7, of the coefficient log $b_g$. Pin Y4 of multiplexer 66 is coupled to one input of XOR gate 30g along data line 81g.

Adder stage 31g comprises adders 68 and 69 such that the carry out terminal CO of adder 69 is coupled to the carry in terminal CI of adder 68. Pins Y1–Y3 of multiplexer 66 is coupled to the B word pins B1–B3, respectively, of adder 68, and pins Y1–Y4 of multiplexer 67 is coupled to the B word pins B1–B4, respectively, of adder 69.

The seven data lines d0–d6 of FIG. 2 are coupled to corresponding lines of data bus 92 of FIG. 1. The data lines d0–d6, therefore, represent the values of the I or Q data samples in logarithmic form that is serially developed on data bus 92 by log ROM 28 of FIG. 1. The lesser significant bits d0–d3 are coupled to the A port pins A1–A4, respectively, of adder 69 and the higher order bits d4–d6 are coupled to the A port pins A1–A3, respectively, of adder 68. The sign bit of the I or Q data sample is carried along data line 82g and is applied to a second input of XOR gate 30g.

To obtain the product constituent data, log $a_g$I and log $b_g$Q, the log I and log Q data are added with the log $a_g$ and log $b_g$ coefficients, respectively, in adder stage 31g. During the I-clock interval data lines d0–d6 contain the I data information and data line 82g contains the I sign bit information. The Y output port of multiplexer 67 contains the lower order bits of the $a_g$ coefficient and the Y port of multiplexer 66 contains the higher order bits. Adder 69 sums the lower order bits of the log I data with the log $a_g$ data to obtain at pins Σ1–Σ4 of the summation output port Σ of the adder, the lower order bits L0–L3 of the I constituent data, log $a_g$I. Adder 68 sums the higher order bits of the log I data with the higher order bits of the log $a_g$ data to obtain at pins Σ1–Σ3 of the summation output port Σ of the adder, the higher order bits L4–L6. The sign bit, bit L7, of the constituent data log $a_g$I is developed at the output or XOR gate 30g and is processed differently than the other bits L0–L6 because these bits are still in logarithmic form. The sign bit L7 is bypassed around antilog ROM 32g to be recombined with the constituent data at the input to latch 33g of FIG. 1.

As mentioned previously, the output of latch 33g along data bus 97g of FIG. 1 is a serial data stream of the I and Q constituents of the G-Y digital sample, as again illustrated in FIG. 4h. To sum corresponding I and Q constituents together, the serial data stream along data bus 97g is demultiplexed and converted into a parallel data stream by a stage 34g. The outputs of stage 34g are two data streams, an I constituent data stream along data bus 98g and a Q constituent data stream along data bus 99g. These two data streams are summed in adder 36g to produce the data stream of G-Y digital samples along data bus 91g. The G-Y data stream is then summed in adder 37g with the Y luminance data stream obtained from luminance processor 27 to produce along a data bus G a data stream of green digital samples for conversion into the analog domain.

The Y luminance digital samples are being supplied to adder 37g at a $4f_{sc}$ rate. To avoid introducing sampling artifacts into the color picture information of the green channel processor, it may be desirable to supply to adder 37g the G-Y color difference digital samples at the same $4f_{sc}$ rate. To accomplish this result the I and Q constituent data streams along data buses 98g and 99g are also supplied with digital samples from stage 34g at the $4f_{sc}$ rate. From an inspection of FIG. 4h, one notes however, that during a given cycle of duration $1/f_{sc}$, between, for example, times $T_1$–$T_5$, only two I or Q constituent samples are being provided. Stage 34g, therefore, incorporates an interpolator section that inserts between consecutive I or Q constituent samples an interpolated value of the constituent to increase the data rate of each constituent to the required $4f_{sc}$ rate.

Figure 3:
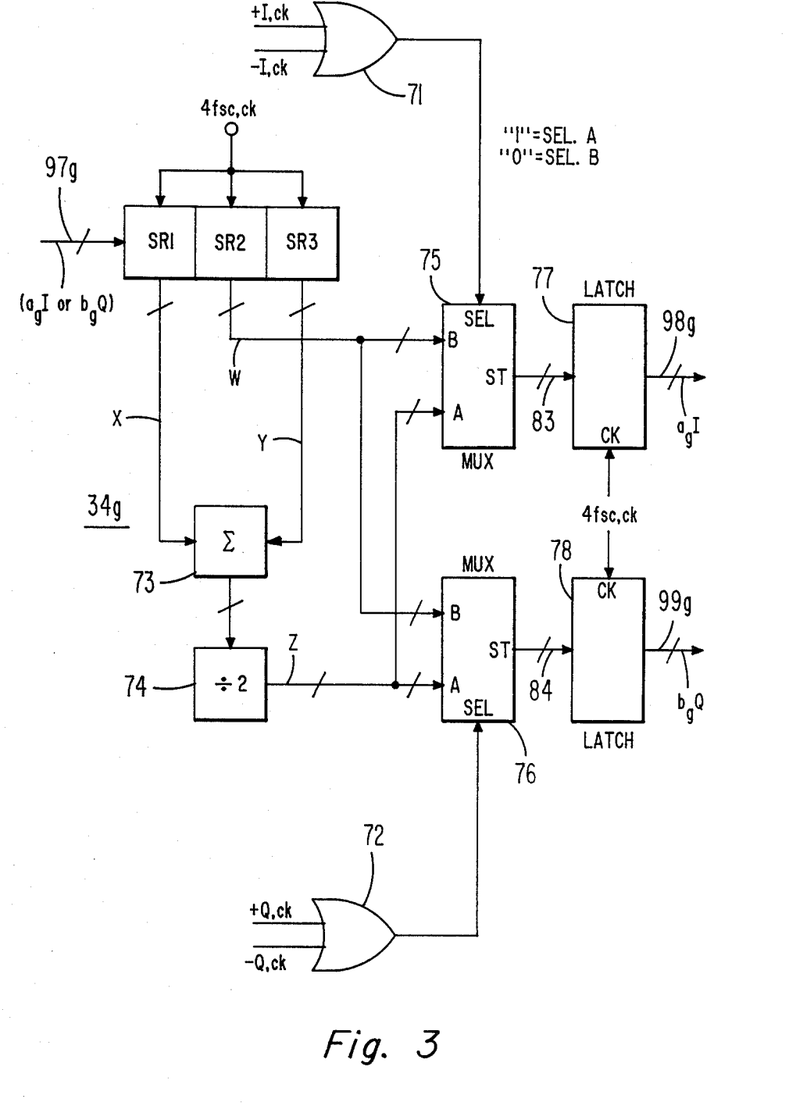
FIG. 3 illustrates a specific embodiment of the interpolator-demultiplexer of the green channel processor of FIG. 1.

FIG. 3 illustrates a specific embodiment of stage 34g of FIG. 1, including structure to provide the demultiplexing, the serial to parallel conversion, and the interpolation functions. Elements and quantities identified the same in FIGS. 1 and 3 perform similar functions or represent similar quantities. Elements similar to those illustrated in FIG. 3 comprise the elements of the other stages 34r and 34b of FIG. 1.

In FIG. 3, the I and Q constituent data stream serially developed along data bus 97g and illustrated in FIG. 4h, is applied to the first stage SR1 of a three stage shift register arrangement comprising shift registers SR1, SR2 and SR3. Data is passed along from one stage to the next subsequent stage at a $4f_{sc}$ clock rate, the same rate at which individual samples of the constituent data are being supplied to shift register SR1. FIG. 4h therefore illustrates the data in shift register stage SR1 and along its output data bus X. FIG. 4i illustrates the data in shift register stage SR2 and along its output data bus W. One notes that the sequence of data in shift register stage SR2 is that of shift register stage SR1 delayed by one $4f_{sc}$ clock. FIG. 4j illustrates the sequence of data in shift register stage SR3 and along its output data bus Y. One notes that the sequence of data illustrated in FIG. 4j is that of FIG. 4i delayed by one $4f_{sc}$ clock.

The outputs of shift register stages SR1 and SR3 are summed in an adder 73 and then divided by two in a divider 74 to produce along an output data bus Z the average value of the data stored in shift registers SR1 and SR3. Because the data stream along data bus 97g alternates between I constituents and Q constituents, the data in shift register stages SR1 and SR3 are both either I constituents or Q constituents during a given clock. One notes from an inspection of FIGS. 4h and 4j, that during the ±I clocks, the data in SR1 and SR3 are I constituent data and during the ±Q clocks, the data are Q constituent data. One further notes from an inspection of FIG. 4k that the data along output data bus Z comprises the average of two adjacent real, I consituent data during the ±I clocks and the average of two adjacent real, Q constituent data during the ±Q clocks. Thus, the serial data along output data bus Z comprises, multiplexed, alternating, interpolated I and Q constituent data, where the interpolation function is one of obtaining the average value $a_g\bar{I}$ $b_g\bar{Q}$ of two adjacent I or Q real, constituent data.

Output data bus Z is coupled to the A input ports of multiplexers 75 and 76. The output of shift register stage SR2 is coupled to the B input ports of multiplexers 75 and 76. Each of the two multiplexers 75 and 76 operates such that when the select terminal of the multiplexer is high or in the logical "1" state, the data at input port A is reproduced at output port ST, and when the select terminal is low or in the logical "0" state, the data at input port B is reproduced at output port ST. For multiplexer 75, the ±I clocks are passed through an OR gate 71 to the select terminal. For multiplexer 76, the ±Q clocks are passed through an OR gate 72 to the select terminal. Output port ST of multiplexer 75 is coupled to a buffer latch 77 and output port ST of multiplexer 76 is coupled to a buffer latch 78. The I constituent data bus 98g of FIG. 1 is coupled to the output of latch 77, and the Q constituent data bus 99g of FIG. 1 is coupled to the output of latch 78.

Multiplexer 75 and 76 perform the functions of demultiplexing the intermixed, real I and Q constituent data streams developed along data bus W and of demultiplexing the intermixed, interpolated I and Q constituent data streams developed along data bus Z. The data streams are converted into two parallel data streams, wherein only the I constituent data, real and interpolated, is developed along data bus 98g and only the Q constituent data, real and interpolated, is developed along data bus 99g.

During the high, ±I clocks of FIGS. 4b and 4d, when the ±Q clocks of FIGS. 4c and 4e are low, the data at input port A of multiplexer 75 and at input port B of multiplexer 76 are selected for reproduction along data buses 83 and 84, respectively. As illustrated in FIGS. 4l and 4m, during the ±I clocks, the interpolated I constituent data, $a_g\bar{I}$ is developed along data bus 83, and the real Q constituent data, $b_gQ$, is developed along data bus 84. During the high, ±Q clocks, when the ±I clocks are low, the data at input port A of multiplexer 76 is selected for reproducing along data bus 84 and the data at input port B of multiplexer 75 is selected for reproducing along data bus 83. As illustrated in FIGS. 4l and 4m during the ±Q clocks, the interpolated Q constituent data, $b_g\bar{Q}$ is developed along data bus 84 and the real I constituent data, $a_gI$, is developed along data bus 83.

By means of clocked, multiplexers 75 and 76, a $4f_{sc}$ rate data stream is developed along data bus 98g, that intermixes real and interpolated values of the I constituent data. Similarly, a $4f_{sc}$ rate data stream is developed along data bus 99g that intermixes real and interpolated values of the Q constituent data. These two data streams are summed in adder 36g of FIG. 1 to produce, at a $4f_{sc}$ rate, the G-Y digital samples. These samples in turn are summed in adder 37g with the $4f_{sc}$ rate Y luminance digital samples to develop the green primary color digital samples along data bus G. Similar situations hold true in the red and blue channel processors.

Figure 5:
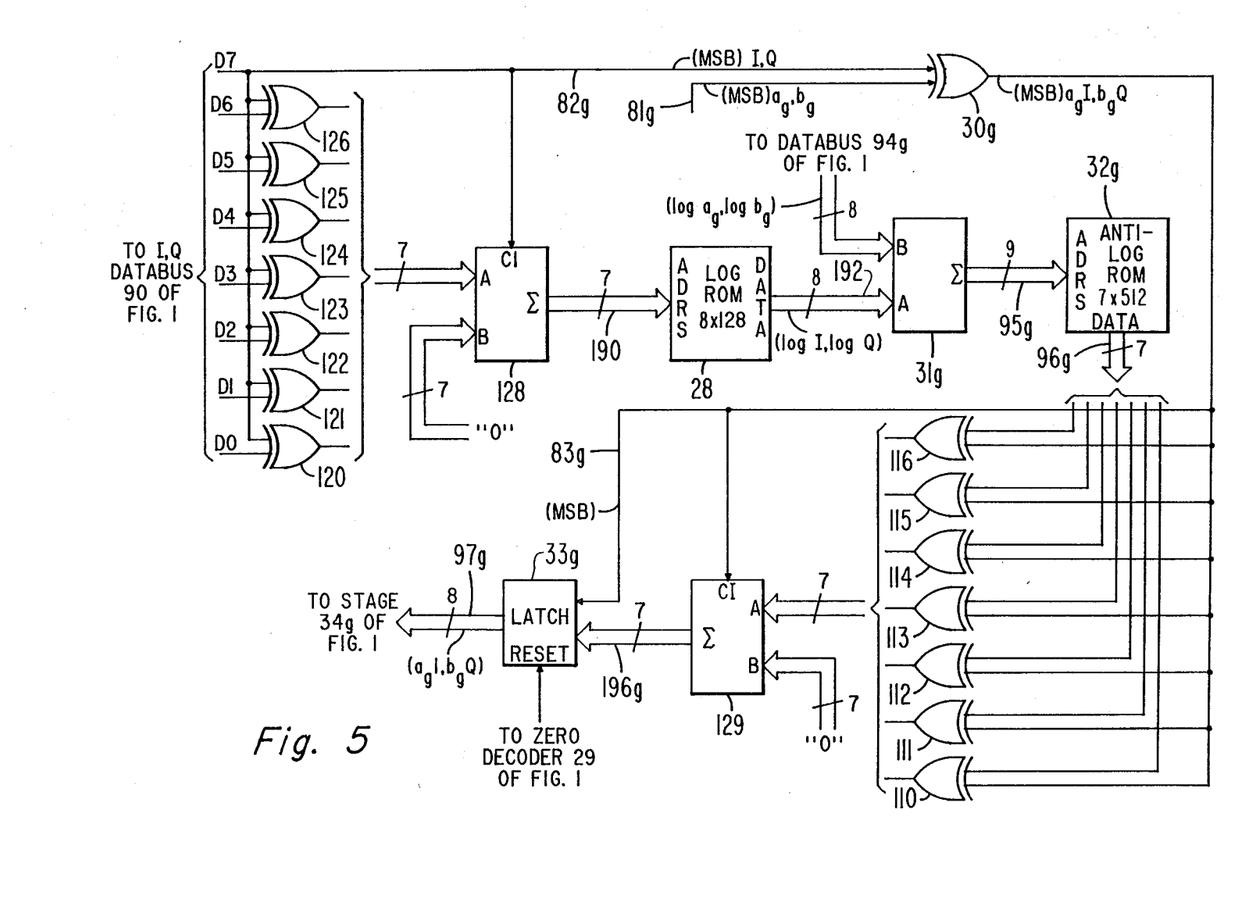
FIG. 5 illustrates a different embodiment of a portion of the system of FIG. 1 and its green channel processor that requires relatively small ROM sizes while maintaining relatively good accuracy.

FIG. 5 illustrates a different embodiment of a portion of the system of FIG. 1 including a portion of the green channel processor that permits one to use relatively small sized read only memories while maintaining relatively good accuracy of the output data. Although FIG. 5 illustrates an embodiment with respect to the green channel processor, modification of the system of FIG. 1 along the lines of that illustrated in FIG. 5 may be made for the red and blue channel processors, with similar advantageous results thereby being obtained. Elements and quantities of FIGS. 1 and 5 identified the same function similarly or represent similar quantities.

In FIG. 5, data bus 90 of FIG. 1, containing the I and Q samples, comprises eight data lines on which the I and Q samples form the data word $D=(D0,...,D7)$. The 8-bit word D represents quantization of the I and Q samples into $2^8$ or 256 levels. As mentioned previously, the I and Q data word D may be represented in offset two's complement notation wherein the most significant bit, bit D7, represents the sign bit. Using such notation, the decimal values of the data word D runs from $+127$ represented by the binary coded word (01111111) to $-128$ represented by the binary coded word (10000000), with zero value being represented by the binary coded word (00000000).

The first processing step illustrated in FIG. 5 is the step of obtaining the logarithmic values of the I and Q sample data words D. Because the logarithmic function is an unsigned function, only the values of the data word D between $+1$ and $+127$ need be processed in the logarithmic operation, provided the sign of the data word, bit D7, is carried along separately. In other words, data samples, D, having the same absolute value, even though of different signs, address the same location in the log ROM look-up table, ROM 28 of FIG. 5.

To enable both positive and negative values of data in offset two's complement notation to address the same location in log ROM look-up table 28, the sign bit, D7, of the data word D is logically combined with each of the lesser significant bits D0–D6 in an exclusive-OR operation performed by XOR gates 120–126. The seven output data lines of XOR gates 120–126 are coupled to the A input port of an adder 128. Coupled to adder input port B are seven data lines, each carrying a logical "0". The data line of the sign bit, bit D7 is coupled to the carry-in terminal CI of adder 128.

If the I or Q data word D is positive, with the sign bit D7 equal to the logical "0", then the operation of XOR gates 120–126 on the data bits D0–D6, respectively, will leave the logical states of the bits at the outputs of the XOR gates unchanged from those of bits D0–D6. With the carry-in terminal of adder 128 at a logical "0" state the output port Σ of adder 128 contains the data bits D0–D6, unchanged in state.

If the I or Q data word D is negative then two's complementing of that data will produce the positive value of the data that is required for addressing log ROM 28. With a negative data word, bit D7 is a logical "1", and the operation of XOR gates 120-126 on the lesser significant bits of the data word, bits D0-D6, produces the one's complementing of these bits. Since the state of the carry-in terminal CI of adder 128 is now at a logical "1", the one's complemented data at input port A is incremented by one to produce the required two's complementing of data bits D0-D6 at the summation port $\Sigma$.

From the above discussion, one notes that both positive and negative values of the data word D address the same location in log ROM 28 when the absolute value of the data is the same. Thus, only seven bits of data along data bus 190 is required to cover the entire range of 256 levels of data. By implementing the two's complement processing of the negative data prior to its being applied to the address port of the log ROM 28, the size of the log ROM 28 is reduced from an 8×256 bit memory to an 8×128 bit memory, assuming an 8-bit data word exits log ROM 28 along data bus 192.

The output of log ROM 28, representing log I and log Q data is summed in proper sequential order with the log coefficients log $a_g$ and log $b_g$ in adder 31g, as described previously, to produce the log of the product data, $a_g$I and $b_g$Q, at a summation output port $\Sigma$. Summation output port $\Sigma$ is coupled to the address input port of antilog ROM 32g by way of data bus 95g.

The output data of antilog ROM 32g, along data bus 96g, represents in offset two's complement notation, the lesser significant bits of the constituent data $a_g$I, $b_g$Q in absolute value. To recover the sign information of the product data, the output of XOR stage 30g, representing the sign bit of the product data, is coupled to an input of each of the XOR gates 110-116. The lesser significant bits of the product data along the seven data lines of data bus 96g, are respectively coupled to the other inputs of the XOR gates. The seven output lines of XOR gates 110-116 are coupled to the A input port of an adder 129 and seven data lines, each carrying a logical "0" are coupled to the B input port. The sign bit of the product data developed along data line 83g is also coupled to the carry-in terminal CI of adder 129.

If the product data is positive, then the sign bit of the product is a logical "0", and the data remains unaffected as it passes through XOR gates 110-116 and adder 129 to develop the seven lesser significant bits at output port $\Sigma$ of adder 129. To reconstitute the eight bit offset two's complement product data word in latch 33g, the seven lesser significant bits of the data word are coupled to the latch by way of data bus 196g and the most significant bit, the sign bit, is coupled to the latch by way of data line 83g.

If the product data is negative, then the sign bit of the product is a logical "1". The operation of XOR gates 110-116 and adder 129 produces the two's complementing of the lesser significant bits of the product data word to place the data word in latch 33g into its proper signed value. Such an arrangement permits a reduction in the size of the read only memory of antilog ROM 32g.

The base of the logarithm use in computing the data stored in log ROM 28 is selected to approximate an optimal fit of the integer arguments, representing I or Q values and $a_i$ or $b_i$ coefficient values, to the chosen dynamic range of the log product. In this way there is a reduction in the errors of computation introduced in obtaining values of the product data exiting an antilog ROM, such as the green channel antilog ROM 32g of FIG. 5.

The method of selecting the logarithmic base is described in the concurrently filed U. S. patent application of H. G. Lewis, Jr. and T. M. Stiller entitled "DIGITAL SIGNAL MULTIPLICATION SYSTEM EMPLOYING LOGARITHMS", Ser. No. 502,014, herein incorporated by reference. By way of example for the green channel processor of FIG. 5, a 7-bit, I or Q data word is developed along data bus 190 having a range of levels equal to $2^7$ or 128. An 8-bit binary word representing in binary notation the logarithm to the base b of the integer, decimal argument associated with the 7-bit I or Q data word is developed by log ROM 28 along data bus 192. Similarly represented by a range of $2^7$ or 128 levels are the coefficients $a_g$ and $b_g$. In the NTSC system, the coefficient $a_g$ is 0.27 in magnitude and the coefficient $b_g$ is 0.65. Assume arbitrarily, however, that each of the coefficients may be adjusted in magnitude between a decimal value of near 0 to a value of near 1. Eight bits are sufficient to accurately represent the log coefficients developed along data bus 94g.

The logarithm to the base b of the product data is developed at the output port of adder 31g and is a 9-bit word to take into account the overflow bit that may arise when summing two 8-bit binary words. The 9-bit binary word along data bus 95g addresses antilog ROM 32g to produce the 7-bit binary product data word developed along data bus 96g prior to its reconversion into offset two's complement form.

To determine the proper base b to provide enhanced computational accuracy, one notes from the previous discussion that the range of levels, for the I or Q data and the $a_g$ or $b_g$ coefficients, is each $2^7$ or 128. The range R of levels of the product data, whose values are in logarithmic form, extends up to the maximum level of $127 \times 127 = 16129$, when the zero cases are omitted from processing. The logarithm L of the product data is a 9-bit binary word having a maximum integer value $L_{max} = 2^9 - 1 = 511$. The base b is chosen so that its maximum logarithm $L_{max}$ equals the logarithm of the range R that the product data may assume. In other words, base b is chosen so that $\log_{base} b (R) = L_{max}$. For $R = 16129$ and $L_{max} = 511$, the base $b = 1.01914051$.

What is claimed is:

1. A logarithmic color matrix for a digital television receiver, comprising:
    first means for generating first color mixture digital signals representing color picture information as components in a first color mixture coordinate system;
    second means responsive to said first color mixture digital signals for converting said first color mixture digital signals into logarithmic form;
    third means for generating digital coefficients in logarithmic form that enable said first color mixture digital signals to be transformed into second color mixture digital signals representing said color picture information as components in a second color mixture coordinate system;
    an adder for summing the first color mixture digital signals in logarithmic form with the digital coefficients in logarithmic form to obtain at an output thereof digital signals in logarithmic form that represent a plurality of products corresponding to the first color mixture constituents of said second color mixture digital signals;

fourth means responsive to the output of said adder for converting by means of inverse logarithmic operation said plurality of products into said first color mixture constituents; and fifth means for combining said first color mixture constituents to obtain said second color mixture digital signals.

2. A logarithmic color matrix according to claim 1 wherein said first means produces, in logarithmic form a sequence of in-phase related and quadrature-phase related components having associated therewith differently valued digital coefficients obtained from said coefficient generating means and including a digital store for storing said differently valued coefficients and a multiplexer coupled to said digital store and to said adder for supplying thereto a sequence of coefficients in the order corresponding to the sequence of in-phase related and quadrature-phase related components.

3. A logarithmic color matrix according to claim 2 wherein said fourth means converts said plurality of products into a sequence of first color mixture constituents having intermixed the in-phase related and the quadrature-phase related components and including a demultiplexer receiving said sequence of first color mixture constituents for providing along a first data bus a sequence of only in-phase related components of said first color mixture constituents and for providing along a second data bus a sequence of only quadrature-phase related componenents.

4. A logarithmic color matrix according to claim 3 wherein said in-phase related and quadrature-phase related components of said first color mixture constituents of said second color mixture digital signals are each developed at a first data rate and including means for developing interpolated values of said in-phase related and quadrature-phase related components to increase the data rate of each of the in-phase related and quadrature-phase related components to a second, higher rate.

5. A logarithmic color matrix according to claim 4 wherein said second color mixture digital signals are represented as color difference components in an R-Y, B-Y coordinate system.

6. A logarithmic color matrix according to claim 5 including means for generating luminance digital signals and means for combining said second color mixture digital signals and said luminance digital signals for developing primary color digital signals.

7. A logarithmic color matrix according to claim 5 wherein said luminance digital signals are being generated at the aforementioned second rate.

8. A logarithmic color matrix according to claim 1 wherein said second means comprises a memory having locations in which are stored logarithmic quantities associated with a plurality of values that said first color mixture signals may assume, a given sample of said first color mixture signals addressing a location within said memory in which the associated logarithmic quantity is stored for developing at a memory output a digital signal in logarithmic form representative of that quantity.

9. A logarithmic color matrix according to claim 8 wherein said fourth means comprises a second memory having locations in which are stored the inverse logarithmic quantities associated with a plurality of values that said first color mixture constituents of said second color mixture digital signals may assume.

10. A logarithmic color matrix according to claim 9 wherein said first color mixture digital signals are supplied to said adder as a sequence of components that are related in phase to first and second color axes of said first color mixture coordinate system, and including a digital store for storing digital coefficients associated with said components of said first color mixture coordinate system and a multiplexer coupled to said digital store for supplying to said adder a different digital coefficient in accordance with the phase relationship of the component of the first color mixture coordinate system that is being sequentially supplied to said adder and wherein said second memory is addressed by a sequence of first color mixture constituents derived from components related in phase to both of said first and second color axes.

11. A multiplexed color matrix for a digital television receiver, comprising:

means for generating first color mixture digital signals in binary-coded form representing color picture information as components in a first color mixture coordinate system;

means for generating digital coefficients in binary-coded form that enable said first color mixture digital signals to be tranformed into second color mixture digital signals representing said color picture information as components in a second color mixture coordinate system;

means for storing said digital coefficients;

a multiplier arrangement receiving said first color mixture digital signals as first inputs and said digital coefficients from said storing means as second inputs to obtain a plurality of products in binary-coded form;

means for sequentially clocking out of said storing means to said multiplier arrangement different ones of said digital coefficients to obtain said plurality of products as a sequence of different first color constituents of said second color mixture digital signals; and means for combining said plurality of products to obtain said second color mixture digital signals.

12. A color matrix according to claim 11 wherein said first color mixture digital signals and said digital coefficients are each in logarithmic binary-coded form and wherein said multiplier arrangement comprises an adder to sum the logarithmic form of the first color mixture digital signals with the logarithmic form of the digital coefficients to obtain the logarithmic form of said first color mixture constituents.

13. A color matrix according to claim 12 wherein said combining means includes a memory in which are stored the inverse logarithmic quantities associated with a plurality of values that the logarithmic form of said first color mixture constituents may assume and includes an adder for summing the appropriate inverse logarithmic quantities together to obtain said second color mixture digital signals.

14. A color matrix according to claim 11 wherein said first color mixture digital signals are supplied to said multiplier arrangement as a sequence of components that are related in phase to first and second color axes of said first color mixture coordinate system, and wherein said clocking out means clocks out a different digital coefficient in accordance with the phase relationship of the component of the first color mixture coordinate system that is concurrently being received by said multiplier arrangement.

* * * * *